US005511908A

United States Patent [19]

[11] Patent Number: 5,511,908
[45] Date of Patent: Apr. 30, 1996

Van Valkenburgh et al.

[54] MOBILE SAFETY STRUCTURE FOR CONTAINMENT AND HANDLING OF HAZARDOUS MATERIALS

[75] Inventors: Norman S. Van Valkenburgh, Oxnard; Gary L. Van Valkenburgh, Ventura, both of Calif.; Edward Payne, Fairfax, Va.

[73] Assignee: The United States of America as represented by the Secretary of the Navy, Washington, D.C.

[21] Appl. No.: 342,451

[22] Filed: Nov. 14, 1994

Related U.S. Application Data

[63] Continuation-in-part of Ser. No. 229,475, Apr. 18, 1994.

[51] Int. Cl.[6] .......... B09B 3/00

[52] U.S. Cl. .......... 405/128; 52/90.1; 405/52; 220/1.5; 206/386; 296/181; 296/187

[58] Field of Search .......... 405/128, 129, 405/52, 53–55; 220/1.5, 69, 688, 692; 52/90.1–93.2, 168, 612, 406–410, 263, 272, 90.2; 280/400; 196/24.1, 187, 181; 206/286

[56] References Cited

U.S. PATENT DOCUMENTS

| | | | |
|---|---|---|---|
| 3,336,069 | 8/1967 | Bayer et al. | 296/24.1 |
| 3,374,029 | 3/1968 | Barkley | 296/187 |
| 4,100,860 | 7/1978 | Gablin et al. | 588/259 X |
| 4,505,126 | 3/1985 | Jones et al. | 296/24.1 X |
| 4,838,178 | 6/1989 | Chriske et al. | 108/55.1 |
| 4,875,595 | 10/1989 | Van Valkenburgh | 220/1.5 |
| 4,875,805 | 10/1989 | Gross | 405/128 |
| 4,955,983 | 9/1990 | Meess et al. | 405/129 |
| 4,973,195 | 11/1990 | Sweeney et al. | 405/52 |
| 5,052,569 | 10/1991 | Cooper | 220/1.5 |
| 5,167,098 | 12/1992 | Blackwelder | 52/91.1 |
| 5,300,137 | 4/1994 | Weyland et al. | 405/128 |
| 5,301,479 | 4/1994 | Romig | 220/1.5 X |
| 5,356,206 | 10/1994 | Van Valkenburgh | 312/317.1 |
| 5,365,013 | 11/1994 | Aulson | 588/249 |
| 5,377,856 | 1/1995 | Brierton | 220/1.5 |

*Primary Examiner*—Dennis L. Taylor
*Attorney, Agent, or Firm*—David Kalmbaugh; Melvin J. Sliwka

[57] ABSTRACT

A mobile safety structure for the storing and handling of containers of hazardous materials which comprises a secondary containment feature in the form of a base assembly having a containment pan. The base assembly also provides a framework for supporting a floor of removable grating which allows access to the containment pan. The mobile safety structure further comprises front, rear and side walls and a roof of very sturdy construction employing interior and outer surface steel panels supported by a generally rectangular shaped tubular steel framework for each wall and the roof of the mobile safety structure. There is sandwiched between the interior and outer surface steel panels of each wall a pair of gypsum boards and R-19 fiberglass insulation. The fiberglass installation allows the user of mobile safety structure to adapt the structure for use under varying climatic conditions, while the gypsum board provides the structure with at least a four hour fire rating. The framework of the mobile safety structure is adapted to receive corner castings and a tow bar which in combination allow a tow truck to move the safety structure from a first location to a second location.

18 Claims, 14 Drawing Sheets

MOBILE SAFETY STRUCTURE FOR CONTAINMENT AND HANDLING OF HAZARDOUS MATERIALS

This application is a continuation-in-part of U.S. patent application Ser. No. 08/229,475, filed Apr. 18, 1994.

BACKGROUND OF THE INVENTION

1. Field of the Invention

This invention relates generally to the handling of hazardous wastes and other hazardous materials. More specifically, the present invention is concerned with a new form of containment unit for handling, distribution, storing and transporting hazardous materials.

2. Description of the Prior Art

The handling, storage and transport of hazardous materials, and particularly hazardous waste has become a problem of major proportions. Increased emphasis is being placed on the importance of assuring that solvents, lubricants, paint related products, and the like are stored with adequate safeguards. Increasingly, it is being recognized that even small spills and relatively minor leakages of the growing number of substances that are being referred to by the term "hazardous material" can detrimentally affect persons, property, plants, animals, ground water and other aspects of ecology and the environment. Moreover, in view of increasing concern about the lasting nature of the adverse effects that can result from spills and unchecked leakage of hazardous materials, the issue of transportation, storage and distribution of hazardous materials is receiving increasing attention by law-makers, by regulatory agencies, and by those who have been elected to govern and to enforce the laws and regulations relating to hazardous materials.

In the past, the standard form of container for the handling, storage and transportation of hazardous materials has been the 55 gallon steel drum. In transportation of hazardous materials using 55 gallon steel drums, the drums are easily ruptured if an accident occurs. A high impact against a gang of the drums in a truck accident, for example, can cause a sort of domino effect wherein sufficient impact is transferred to a great number of the drums to rupture the drums. This is due to the basic cylindrical shape of the drum as well as its relatively thin walled construction.

During transportation and storage of the drums another hazard which may occur when full drums are stacked which they frequently are because their shape clearly lends itself to stacking. In many instances the drums are stacked eight or nine tiers high. These drums often leak, with the leaking chemicals flowing down to mix with other chemicals below. In this situation, even if the individual chemicals are not in themselves particularly hazardous, an unknown and hazardous combination may result.

When using cylindrical drums there is another potential hazard in that the drums are inherently reusable, even if the drums are not intended for this purpose. Unwitting reuse with an incompatible chemical can cause an explosion or the creation of a dangerous, explosive, poisonous or otherwise hazardous combination. The inherent re-usability of cylindrical drums is a significant disadvantage. Cylindrical drums with explosive materials have been known to ignite and shoot through a building roof in the manner of a rocket. Explosive material can dry and harden from the outside in toward the center of the drum, leaving a hollow core which can act as a rocket nozzle. This is another inherent disadvantage in use cylindrical drums for the storage of explosive hazardous materials.

For these and other reasons, there remains a very genuine and real need for a well designed, heavy duty containment facility that appropriately will address today's increasing concern for the way in which hazardous materials are handled, transported and stored.

There is also a need for a hazardous material containment structure which allows the user to maintain an inventory of the hazardous materials being stored and maintain within the structure.

SUMMARY OF THE INVENTION

The structure of the present invention addresses the foregoing and other needs of hazardous material storage, handling and transportation by providing a environmentally safe modular storage unit which will provide a good service life and under circumstances of reasonable use, can be moved from site to site over the years as may be appropriate to address a series of different servicing needs.

The structure of the present invention includes a base assembly having a containment pan, right side and left side walls with the left side wall having a sliding glass window and front and rear walls with the front wall having a door allowing for access to the interior of the structure by its user. The base assembly of the mobile safety structure has at each corner thereof a corner fitting which is adapted to receive dual wheel casters. The corner fittings at each end of the mobile safety structure are also adapted to receive a tow bar which in combination with the dual wheel casters allows a tow truck to move the mobile safety structure from a first location to a second location.

A removable fiberglass or the like grating is also included in the mobile safety structure which rest atop the base assembly. The removable grating allows the user of the structure to remove hazardous materials from the containment pan by use of, for example, a pump. The removable grating also allows the user of the mobile safety structure to visually inspect the interior of the containment pan for hazardous materials which may be contained therein.

The walls, and roof of the mobile safety structure provide for a strong structural enclosure by using interior and outer surface steel panels supported by a generally rectangular shaped tubular steel framework for each wall and the roof of the mobile safety structure. There is sandwiched between the interior and outer surface steel panels of each wall a pair of gypsum boards and R-19 fiberglass insulation. The fiberglass installation allows the user of mobile safety structure to adapt the structure for use under varying climatic conditions, while the gypsum board provides the structure with at least a four hour fire rating.

A better understanding of the mobile safety structure as well as a better recognition of its advantages and novel features will be afforded to those skilled in the art from a consideration of the following detailed description of the a preferred embodiment thereof.

DETAILED DESCRIPTION OF THE PREFERRED EMBODIMENT

Figure 1:
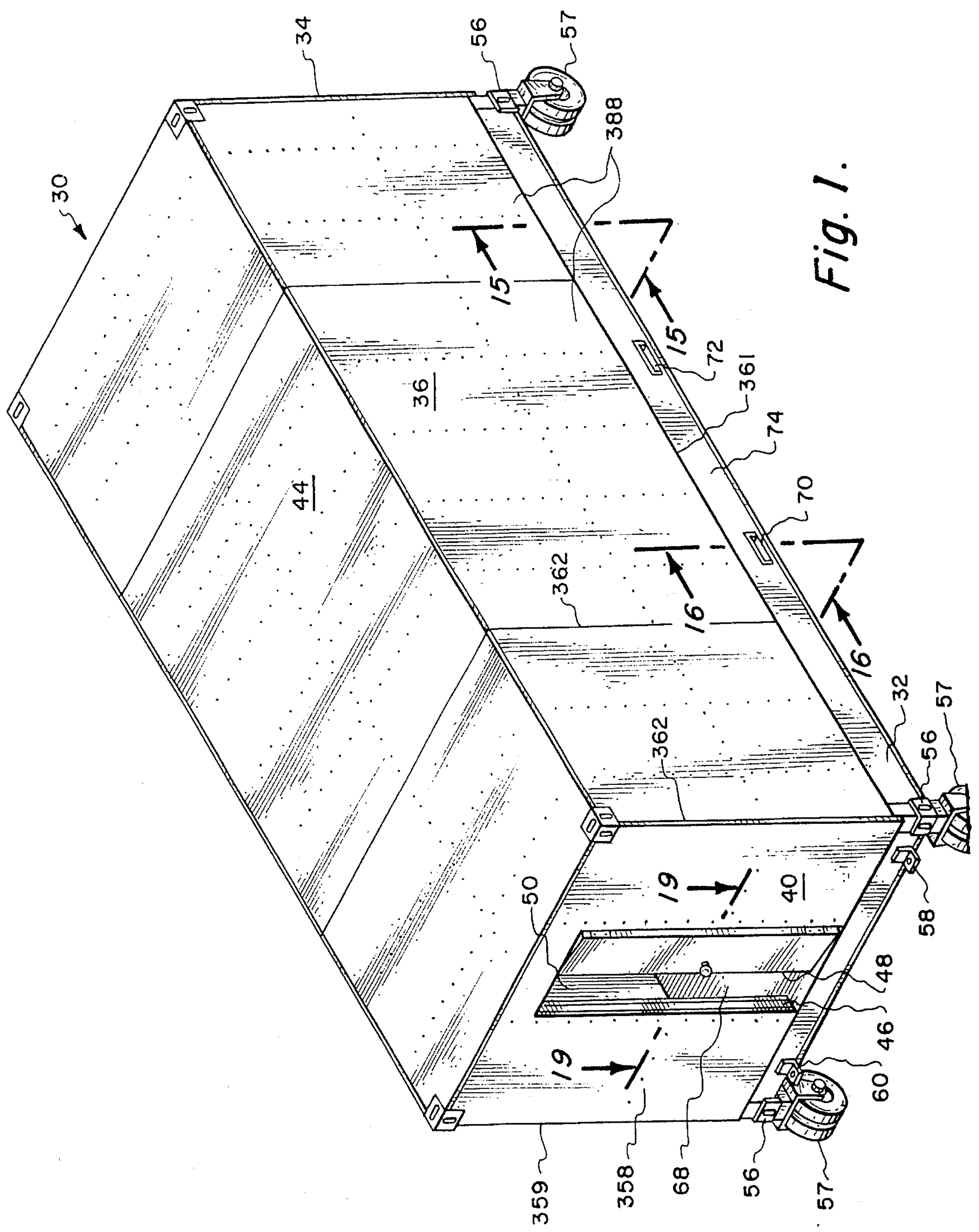
FIG. 1 is a perspective view of a form of a mobile safety structure including a door that constitutes the preferred embodiment of the present invention.
Figure 2:
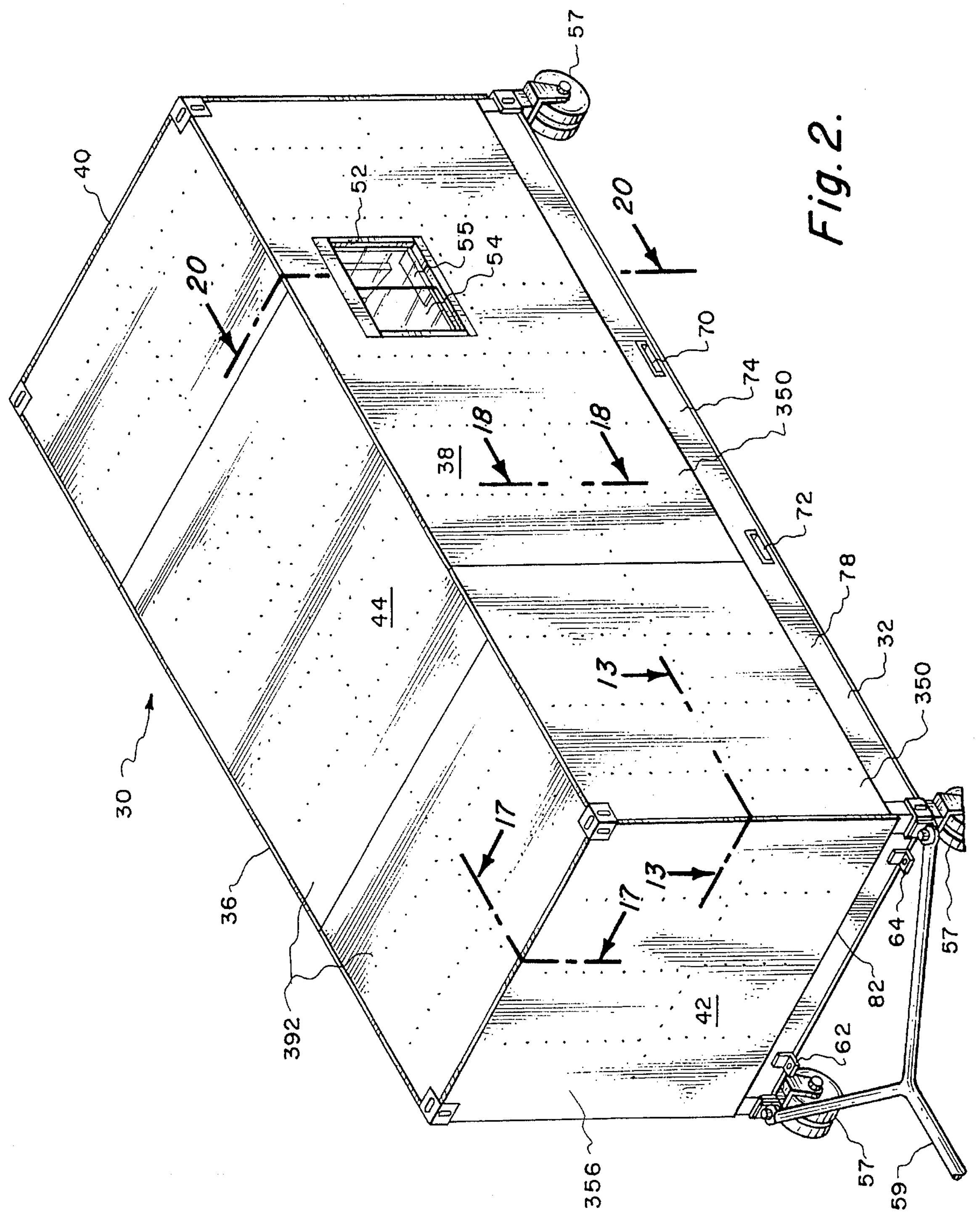
FIG. 2 is an alternate perspective view of a form of the mobile safety structure including a sliding glass window of the present invention.

Referring to FIGS. 1 and 2, there is shown a "mobile safety structure" or "containment structure" that represents the best mode carrying out the preferred practice of the present invention and is designated by the reference numeral 30. Mobile safety structure 30 has the general shape of a rectangular box like structure.

In overview, the mobile safety structure 30 has a base assembly 32 or skid and an assembly of upstanding walls 34, that is supported on base assembly 32. Mobile safety structure 30 also includes a roof assembly 44, that is supported atop the rectangularly shaped assembly of upstanding walls 34.

The assembly of upstanding walls 34 consist of a right side wall 36, a left side wall 38, a front wall 40 and a rear wall 42. A door frame assembly 46 is incorporated into front wall 40 and pivotally mounts a door 48 which controls access to the interior 50 of mobile safety structure 30.

A window frame structure 52, which is incorporated in left side wall 38, includes a sliding glass teller window 54 which may be opened and closed as required. Window 54 allows the user of mobile safety structure 30 to observe the environment outside of mobile safety structure 30 and also allows the user of structure 30 to communicate with individuals outside of structure 30. Sliding glass teller window 54 also a teller drawer 55 which allows an individual outside of mobile safety structure 30 to supply documents and the like to a user of mobile safety structure 30.

Base assembly 32 of safety structure 30 includes four identical wheel support assembles/corner fittings 56 with one wheel support assembly 56 being positioned at each corner of base assembly 32. Each wheel support assembly 56 is adapted to receive a dual wheel caster 57 which, when affixed to mobile safety structure 30 allows structure to be moved from one location to another location within, for example, a warehouse or an ocean going vessel.

The base assembly 32 of mobile safety structure 30 has attached to its front end a pair of L-shaped support brackets 58 and 60 which are used as seismic tie downs allowing the front end of safety structure 30 to be secured to a concrete slab or the like. Similarly, there is attached to the rear end of base assembly 32 a pair of L-shaped support brackets 62 and 64 which are also adapted for securing the rear end of safety structure 30 to the concrete slab. Each L-shaped support bracket 58, 60, 62 and 64 has an aperture through which a chain may be inserted to secure to mobile safety structure 30 to the concrete slab.

As is best illustrated by FIG. 2, the corner fittings 56 at the rear end of mobile safety structure 30 are also adapted to secure a tow bar 59 to mobile safety structure 30 allowing structure 30 to be towed by a tow truck from one location to another location. In a like manner, the corner fittings 56 at the front end of mobile safety structure 30 may also be used to secure a tow bar to mobile safety structure 30. Each dual wheel caster 57 may be either pivotal of held in a fixed position depending upon the placement of the tow bar. For example, when the tow bar is secured to the rear end of mobile safety structure 30 the dual wheel casters 57 at the rear end of mobile safety structure 30 are pivotal, while dual wheel casters 57 at the front end of mobile safety structure 30 are held in a fixed position. This, in turn, allows a tow truck to maneuver about a corner of a building or any other curved surface.

The preferred embodiment of the mobile safety structure 30 has overall length of 21 feet, a width of 8 feet 6 inches and a height of 9 feet 6 inches which includes the height of the four dual wheel casters 57. The approximate weight of mobile safety structure is about 12,900 pounds and mobile safety structure 30 is fabricated from steel which is fire proof and non-corrosive.

The interior 50 of mobile safety structure 30 includes a floor 68 which is supported atop base assembly 32 and extends throughout the interior of structure 30 from the front wall 40 to the rear wall 42 and from the right side wall 36 to the left side wall 38. Floor 68 may be a solid or grated floor fabricated from a non-spark materials such as fiberglass or aluminum.

The base assembly 32 of mobile safety structure 30 has a pair of elongated slots 70 and 72 which run the width of structure 30. The slots 70 and 72 are positioned about a center point 74 of base assembly 32 and are positioned to receive the forks of a fork lift truck (not illustrated). Specifically, the center point of base assembly 32 is located 10 feet 6 inches from each corner of structure 30 and the center to center distance between slots 70 and 72 is five feet. Placing the slots 70 and 72 about center point 74 insures that a balance load occurs on the forks of a fork lift truck when the fork lift truck moves structure 30 from a first location to a second location.

Referring to FIG. 1, 2, 3, there is shown the rectangular shaped framework or support structure, designated generally by the reference numeral 33, for the base assembly 32 of mobile safety structure 30. Support structure 33 includes a right side tubular support member 76 which runs the length of right side wall 36, a left side tubular support member 78 which runs the length of left side wall 38, a front end tubular support member 80 which runs the length of front wall 40 and a rear end tubular support member 82 which runs the length of rear wall 42. Front and rear end tubular support members 80 and 82 each have attached thereto by means of a weld (not shown) a floor support member 84 upon which the floor 68 of mobile safety structure 30 is partially supported.

Support structure 33 has a pair of inverted T channel support members 86 and 88 which are placed perpendicular to support members 76 and 78 and are positioned about a centrally located C channel support member 90. Support Structure 33 also has a pair of C channel support members 92 and 94 placed parallel to rear end tubular support member 82 between members 82 and 86. Further, support structure 33 has a pair of C channel support members 96 and 98 placed parallel to front end tubular support member 80 between members 80 and 88.

Referring to FIGS. 2, 3, 10, 11 and 12, there is shown the corner framework 100 for support structure 33 of base assembly 32 which joins left side tubular support member 78 to rear end tubular support member 82. For the purpose of illustration only the corner framework 100 will be discussed since the corner framework for each of the remaining three corners of base assembly 32 is identical to the corner framework illustrated in FIGS. 3 and 4.

Figure 11:
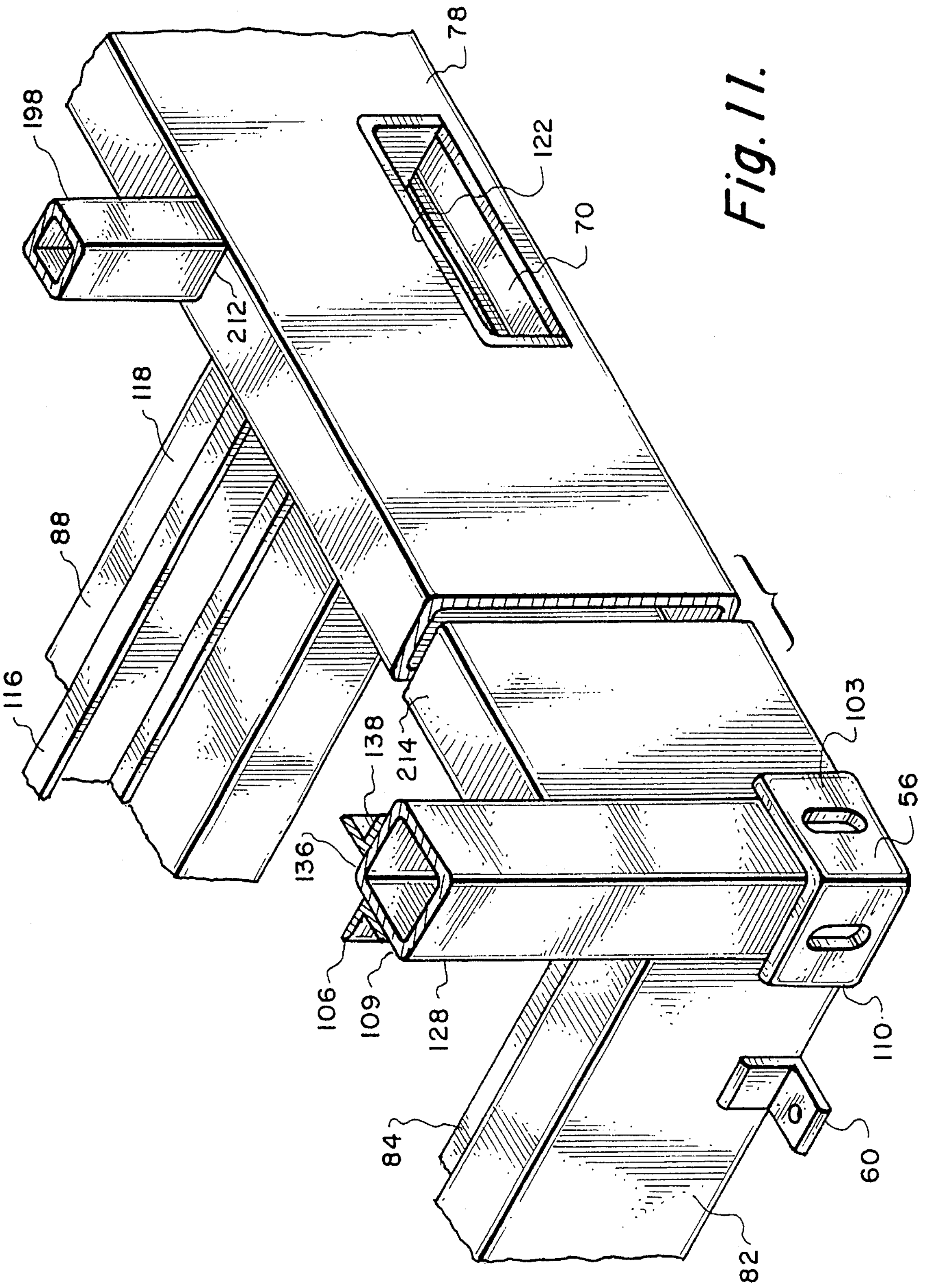
FIG. 11 is an isometric view of a corner taken along line 11 of FIG. 10 for the base assembly of the mobile safety structure of FIG. 1.
Figure 12:
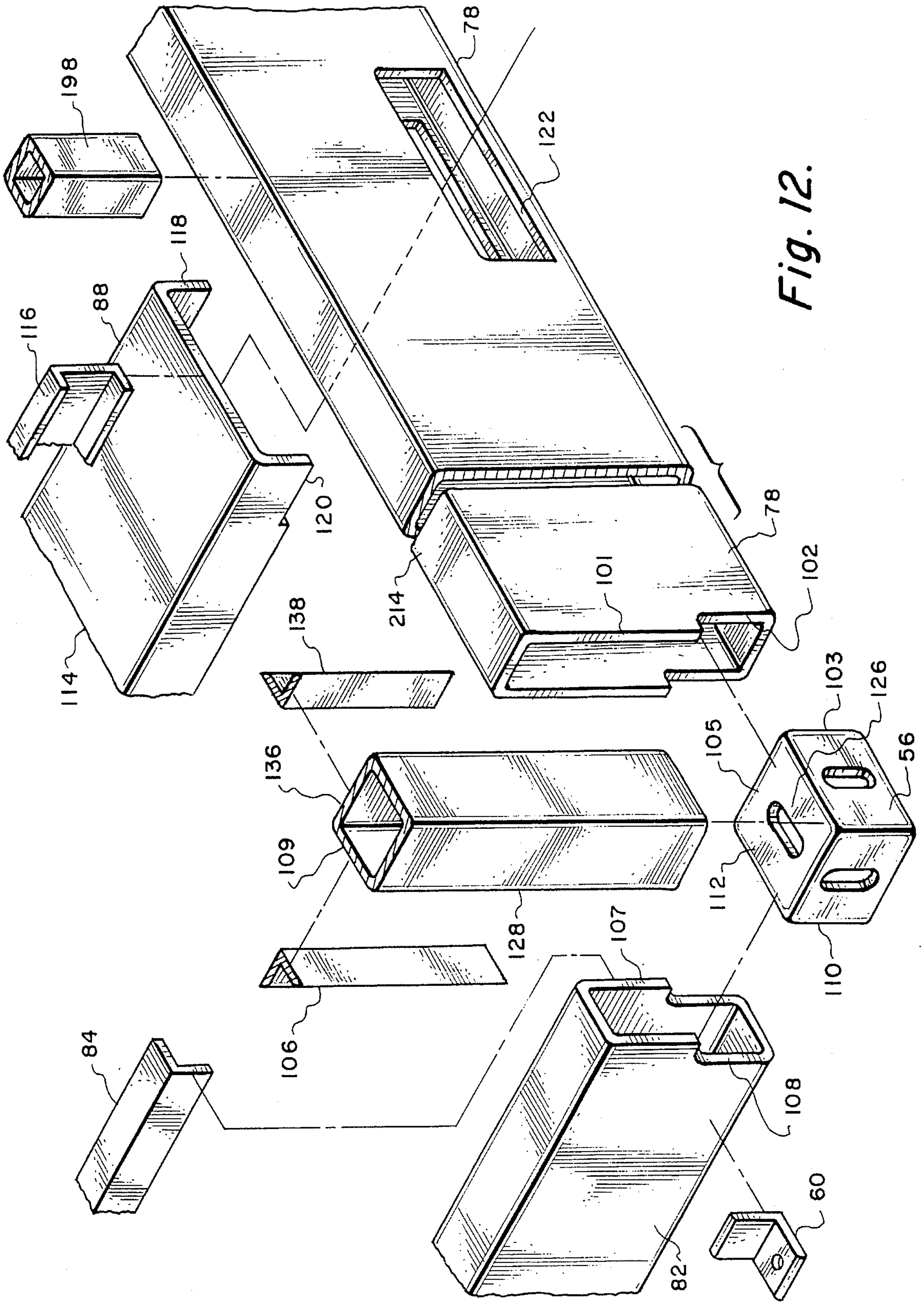
FIG. 12 is an exploded isometric view of the corner of FIG. 11.

As is best illustrated in FIG. 12 left side tubular support member 78 has at its end 101 an L shaped indent 102 which is adapted to receive a first side 103 and a top edge portion 105 of a corner fitting 56. Similarly, rear end tubular support member 82 has at its end 107 an L shaped indent 108 adapted to receive a second side 110 (angled at ninety degrees from side 103) and a top edge portion 112 of corner fitting 56. As is best illustrated in FIG. 11, when attached to corner fitting 56, members 78 and 82 form a corner of base assembly 32. The remaining three corners of base assembly are formed in an identical manner using a corner fitting of the type illustrated in FIG. 12 which results in base assembly 32 having a rectangular shape. Members 78 and 82 are attached to corner fitting 56 by means of welds (not shown).

At this time, it should be noted that right side tubular support member 78 and rear end tubular support member 82 are fabricated from structural tubular steel which is non-corrosive and chemical resistant. Similarly left side tubular support member 76 and front end tubular support member 80 are also fabricated from 12 gauge structural tubular steel.

Inverted T channel support members 86 and 88 are formed by base channel member 114 and a floor support channel member 116 mounted on top of member 114 and secured thereto by means of a weld (not shown). Channel member 114 and 116 are also fabricated from 12 gauge structural tubular steel which is non-corrosive and chemical resistant. Base channel member 114 of inverted T channel support members 86 and 88 has at each end 118 on the bottom portion thereof an L shaped indent 120.

Figure 3:
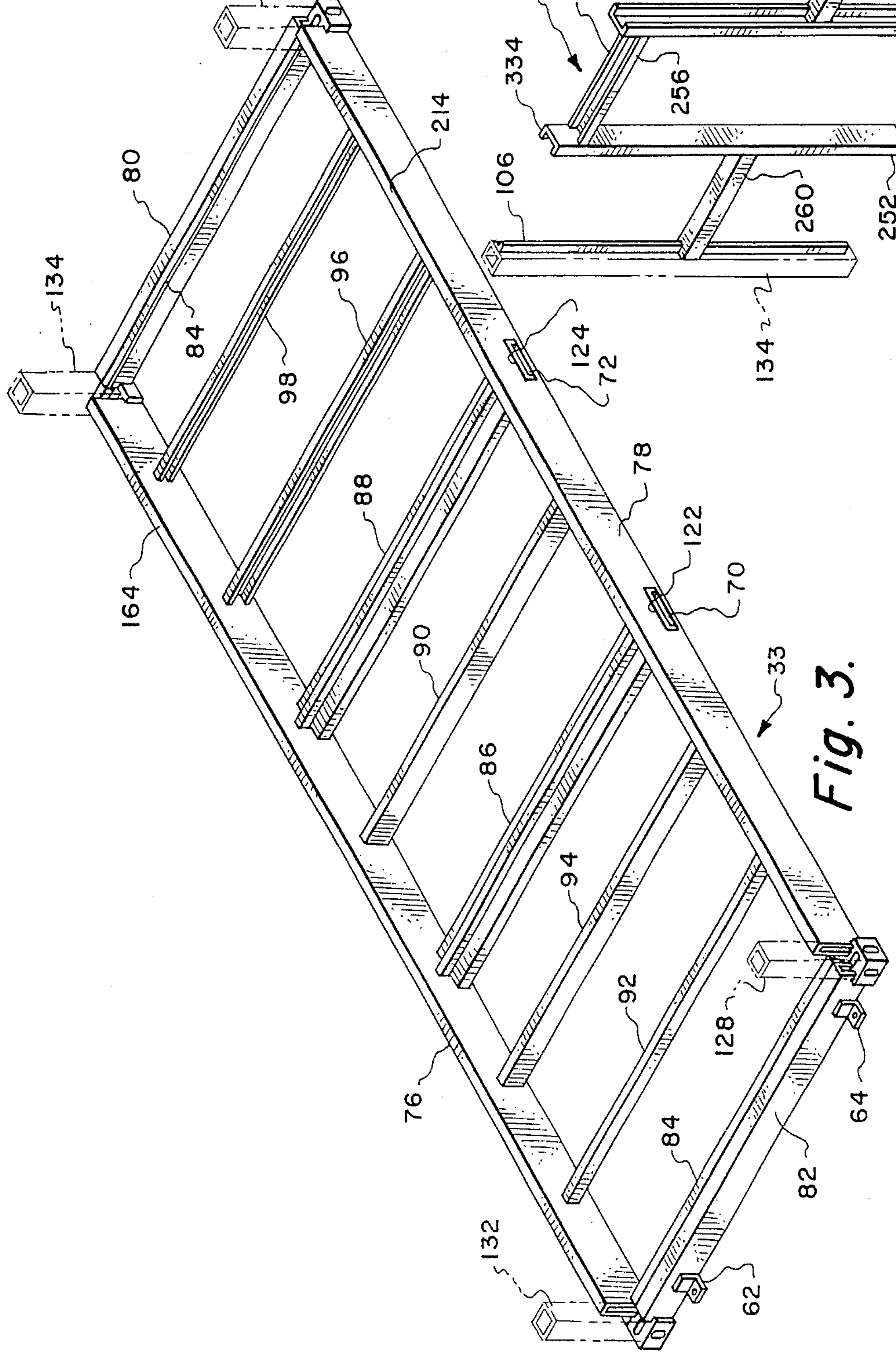
FIG. 3 is an isometric view of the framework of the base assembly for the mobile safety structure of FIG. 2.
Figure 10:
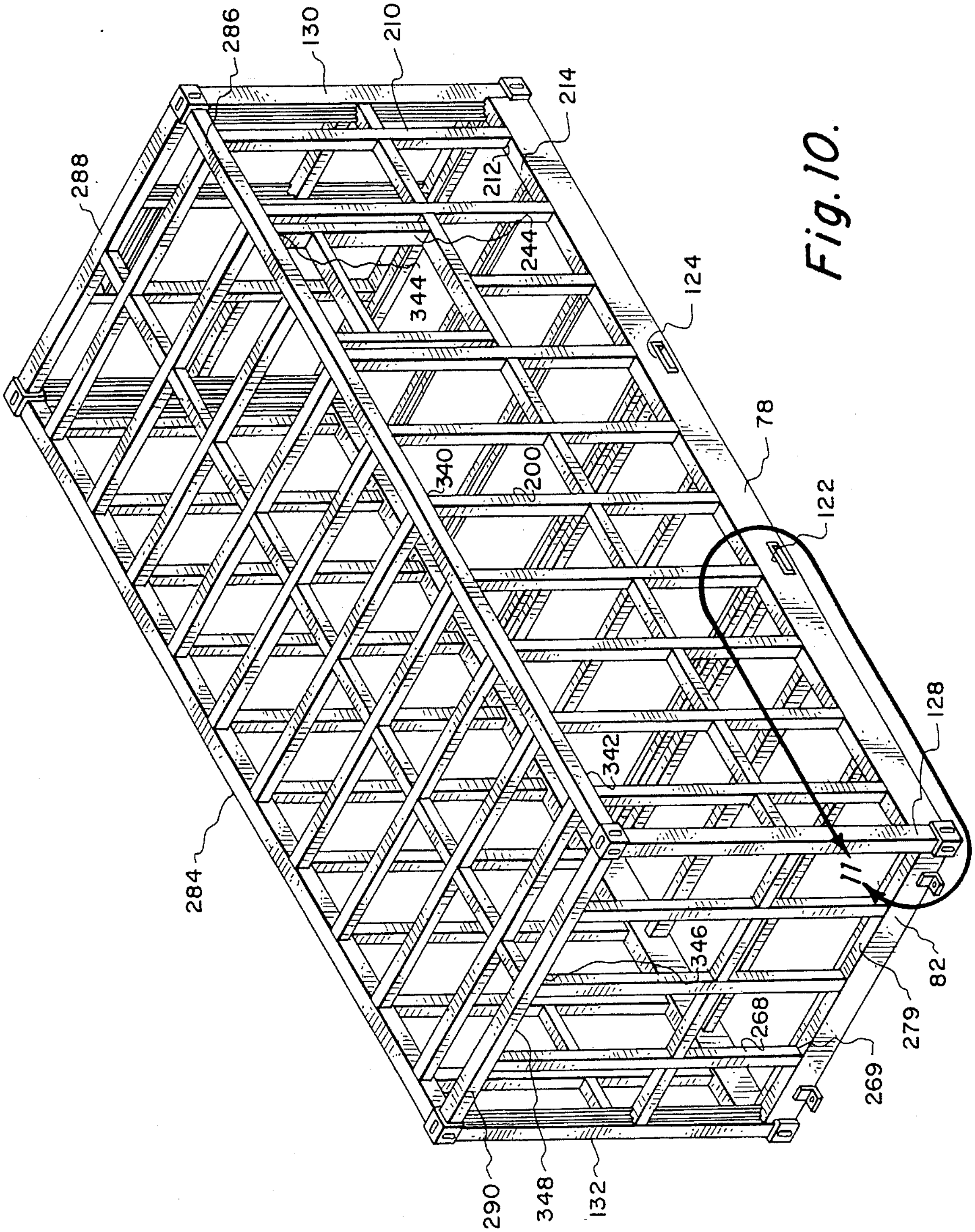
FIG. 10 is an alternate isometric view of the framework including the sliding glass window frame for the mobile safety structure of FIG. 2.

Referring to FIGS. 3, 10 and 12 left side tubular support member 78 has a pair of rectangular shaped openings 122 and 124 (illustrated in FIG. 12). Opening 122 receives and then secures end 118 including L shaped indent 120 of T channel support member 88 to left side tubular support member 78, while opening 124 receives and then secures end 118 including L shaped indent 120 of T channel support member 86 to left side tubular support member 78. The opposite ends 118 of inverted T channel support members 86 and 88 are secured to right side tubular support member 76 in exactly the same manner as illustrated in FIGS. 11 and 12.

There is mounted on a top center portion 126 of corner fitting 56 a tubular corner support member 128, which is rectangular in shape and which is secured to corner fitting 56 by means of a weld (not shown). Corner support member 128 is also attached to rear end tubular support member 82 and left side tubular support member 76 by means of welds (not shown).

As shown in phantom in FIG. 3, there is located at each of the remaining corners of base assembly 32 a corner support member identical to corner support member 128 with each corner support member extending upward from base assembly. Specifically, the left front corner of base assembly 32 has a corner support member 130 which extends upward from base assembly 32, the right rear corner of base assembly 32 has a corner support member 132 which extends upward from base assembly 32 and the right front corner of base assembly 32 has a corner support member 134 which extends upward from base assembly 32. Each corner support member 128, 130, 132 and 134 has welded to a inner side 136 a corner brace 138. Each corner support member 128, 130, 132 and 134 also has welded to an inner side 109 a corner brace 106.

Figure 9:
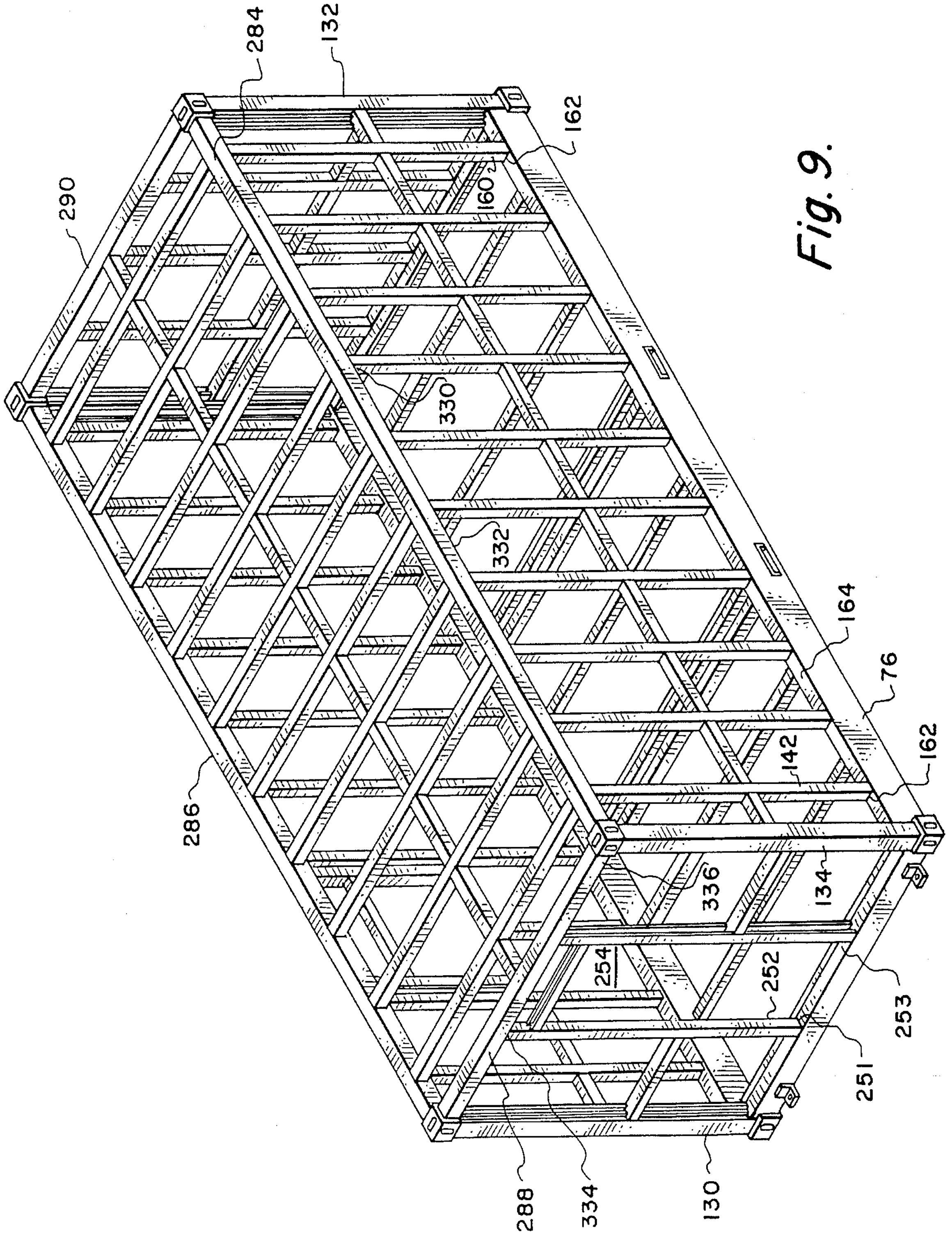
FIG. 9 is an isometric view of the framework including the door frame for the mobile safety structure of FIG. 1.

Referring to FIGS. 1, 4, 9 and 10, there is shown the rectangular shaped framework or support structure, designated generally by the reference numeral 140, for the right side wall 36 of mobile safety structure 30. Framework 140 includes a plurality of tubular wall support members 142, 144, 146, 148, 150, 152, 154, 156, 158 and 160 which extend upwardly from right side tubular support member 76. As is best illustrated in FIG. 9, each tubular wall support member 142–160 has its lower ends 162 attached to the top 164 of member 76 by means of a weld (not shown). Tubular cross braces 166, 168, 170, 172, 174, 176, 178, 180 and 182 are interposed between their two associated adjacent tubular wall support members 142–160. In a like manner a tubular cross brace 184 is interposed between corner support member 132 and tubular wall support member 142, while a tubular cross brace 186 is interposed between corner support member 134 and tubular wall support member 160. Welds (not shown) secure each end of the cross braces 166–186 to its associated wall support member 142–160 or corner support member 132 and 134.

Referring to FIGS. 2, 5, 9 and 10, there is shown the rectangular shaped framework or support structure, designated generally by the reference numeral 190, for the left side wall 38 of mobile safety structure 30. Framework 190 includes a plurality of tubular wall support members 192, 194, 196, 198, 200, 202, 204, 206, 208 and 210. which extend upwardly from left side tubular support member 78. As is best illustrated in FIGS. 10 and 11, each tubular wall support member 192–210 has its lower ends 212 attached to the top 214 of member 78 by means of a weld (not shown). Tubular cross braces 216, 218, 220, 222, 224, 226 and 230 are interposed between their two associated adjacent tubular wall support members 192–204, 208 and 210. In a like manner a tubular cross brace 232 is interposed between corner support member 128 and tubular wall support member 192, while a tubular cross brace 234 is interposed between corner support member 130 and tubular wall support member 210. Welds (not shown) secure each end of the cross braces 216–234 to its associated wall support member 192–210 or corner support member 128 and 130.

Framework 190 also includes window frame structure 52 consisting of cross brace 228 which is interposed between adjacent tubular wall support members 204 and 208, channel members 242 and 244 which extend upwardly from tubular cross brace 228 and a channel member 246 which is interposed between channel members 242 and 244. Sliding glass teller window 54 is mounted in window frame structure 52.

Figure 6:
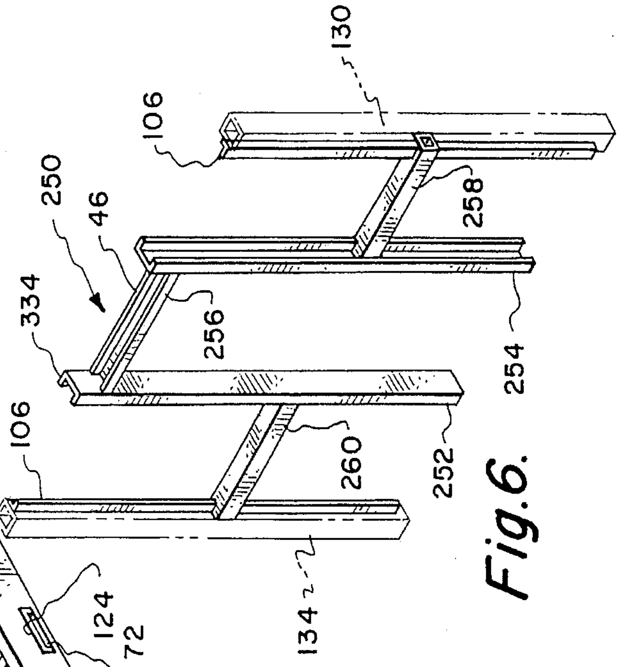
FIG. 6 is an isometric view of the wall support structure for the front wall including a door frame of the mobile safety structure of FIG. 2.

Referring to FIGS. 1, 6 and 9, there is shown the rectangular shaped framework or support structure, designated generally by the reference numeral 250, for the front wall 40 of mobile safety structure 30. Support structure 250 includes door frame assembly 46 consisting of a pair of channels members 252 and 254 which extend upwardly from base assembly 32. Channel members 252 and 254 have their lower end 251 attached to the top 253 of front end tubular support member 80 of base assembly by means of welds (not shown). Door frame assembly 46 also includes a cross channel member 256 interposed between channel members 252 and 254 at the top of door frame assembly 46. Support structure 250 also includes a tubular cross brace 258 interposed between channel member 254 and corner support member 130 and a tubular cross brace 260 interposed between channel member 252 and corner support member 134. Cross braces 258 and 260 are coupled to their associated channel members 252 and 254 and corner support members 130 and 134 by means of welds (not shown).

Figure 7:
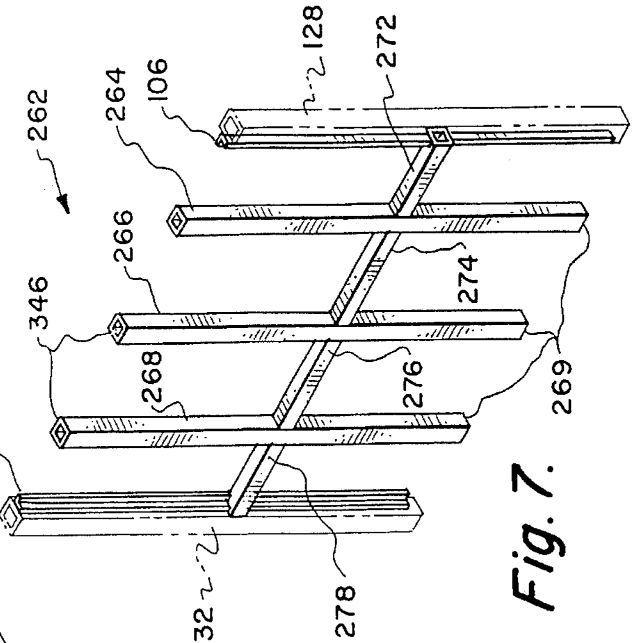
FIG. 7 is an isometric view of the wall support structure for the rear wall of the mobile safety structure of FIG. 2.

Referring to FIGS. 2, 7 and 10, there is shown the rectangular shaped framework or support structure, designated generally by the reference numeral 262, for the rear wall 42 of mobile safety structure 30. Support structure 262 includes a plurality of tubular wall support members 264, 266 and 268 which extend upwardly from base assembly 32. Tubular wall support members 264, 266 and 268 are attached to rear end tubular support member 82 of base assembly 32 by means of welds (not shown). Support structure 262 also includes a plurality of tubular cross braces 272, 274, 276 and 278. Cross brace 272 is interposed between corner support member 128 and wall support member 264, cross brace 274 is interposed between adjacent wall support members 264 and 266, cross brace 276 is interposed between adjacent wall support members 266 and 268 and cross brace 278 is interposed between corner support member 132 and wall support member 268. Cross braces 272, 274, 276 and 278 are coupled to their associated wall support members 264, 266 and 268 and corner support members 128 and 132 by means of welds (not shown).

As is best illustrated in FIG. 10, each tubular wall support member 264, 266 and 268 has its lower ends 269 attached to the top 279 of member 82 by means of a weld (not shown).

Figure 8:
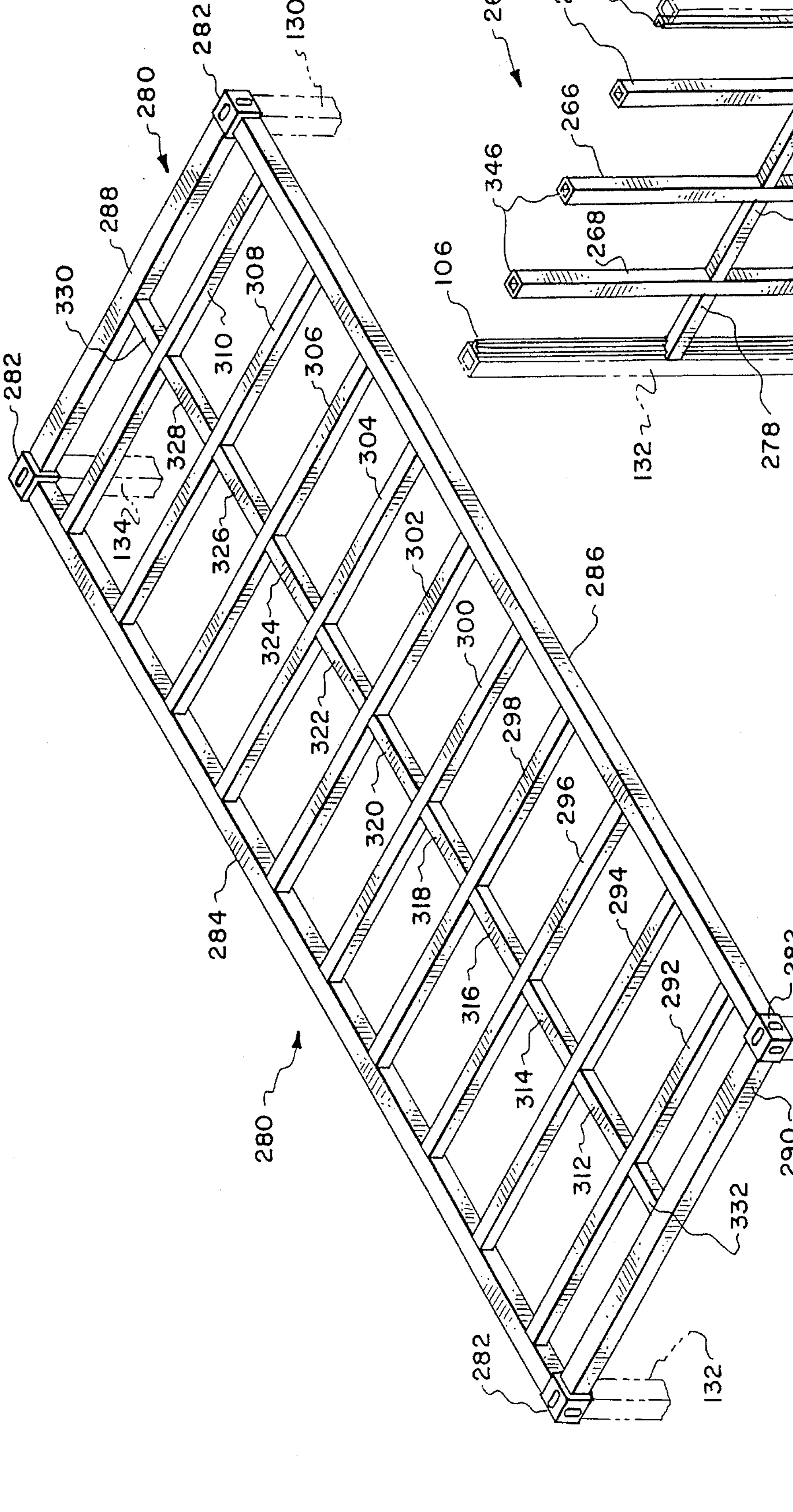
FIG. 8 is an isometric view of the roof support structure for the roof assembly of the mobile safety structure of FIG. 2.

Referring to FIGS. 2, 8 and 10, there is shown the rectangular shaped framework or support structure, designated generally by the reference numeral 280, for the roof assembly 44 of mobile safety structure 30. Support structure 280 (FIG. 8) includes four corner fittings 282 with one corner fitting being positioned at each corner of roof assembly 44 (FIGS. 1 and 2). Support structure 280 also includes a right side tubular support member 284 which runs the length of right side wall 36, a left side tubular support member 286 which runs the length of left side wall 38, a front end tubular support member 288 which runs the length of front wall 40 and a rear end tubular support member 290 which runs the length of rear wall 42. Support members 284, 286, 288 and 290 are attached to their associated corner fittings 282 by means of welds (not shown). Corner support members 128, 130, 132 and 134 are also attached to their associated corner fittings 282 by means of welds (not shown).

The wheel support assemblies/corner fittings 96 and 282 used at each corner of base assembly 32 and roof assembly 44 of mobile safety structure 30 are cast steel iso type corner fittings, model no. 72043-VS, manufactured by Tandemloc, Inc. of Ronkonkoma, N.Y.

Support structure 280 has a plurality of tubular roof support members 292, 294, 296, 298, 300, 302, 304, 306, 308 and 310 which are positioned parallel to front and rear end tubular support members 288 and 290 and which extend from right side tubular support member 284 to left side tubular support member 286. Tubular cross braces 312, 314, 316, 318, 320, 322, 324, 326 and 328 are interposed between their two associated adjacent tubular roof support members 292, 294, 296, 298, 300, 302, 304, 306, 308 and 310. In a like manner a tubular cross brace 330 is interposed between front end tubular support member 288 and roof support member 310 and a tubular cross brace 332 is interposed between rear end tubular support member 290 and roof support member 292. The right and left ends of tubular support members 292–310 are respectively attached to right side tubular support member 284 and left side tubular support member 286 by means of welds (not shown). Tubular cross braces 312–332 are also attached to their associated roof support members 292–310 and front and rear end tubular support members 288 and 290 by means of welds (not shown).

As shown in phantom in FIG. 8 each tubular corner support member 128, 130, 132 and 134 is affixed to one of the four corner fittings 282 of support structure 280 and secured to its associated corner fitting 282 by means of a weld (not shown).

Figures 4, 5:
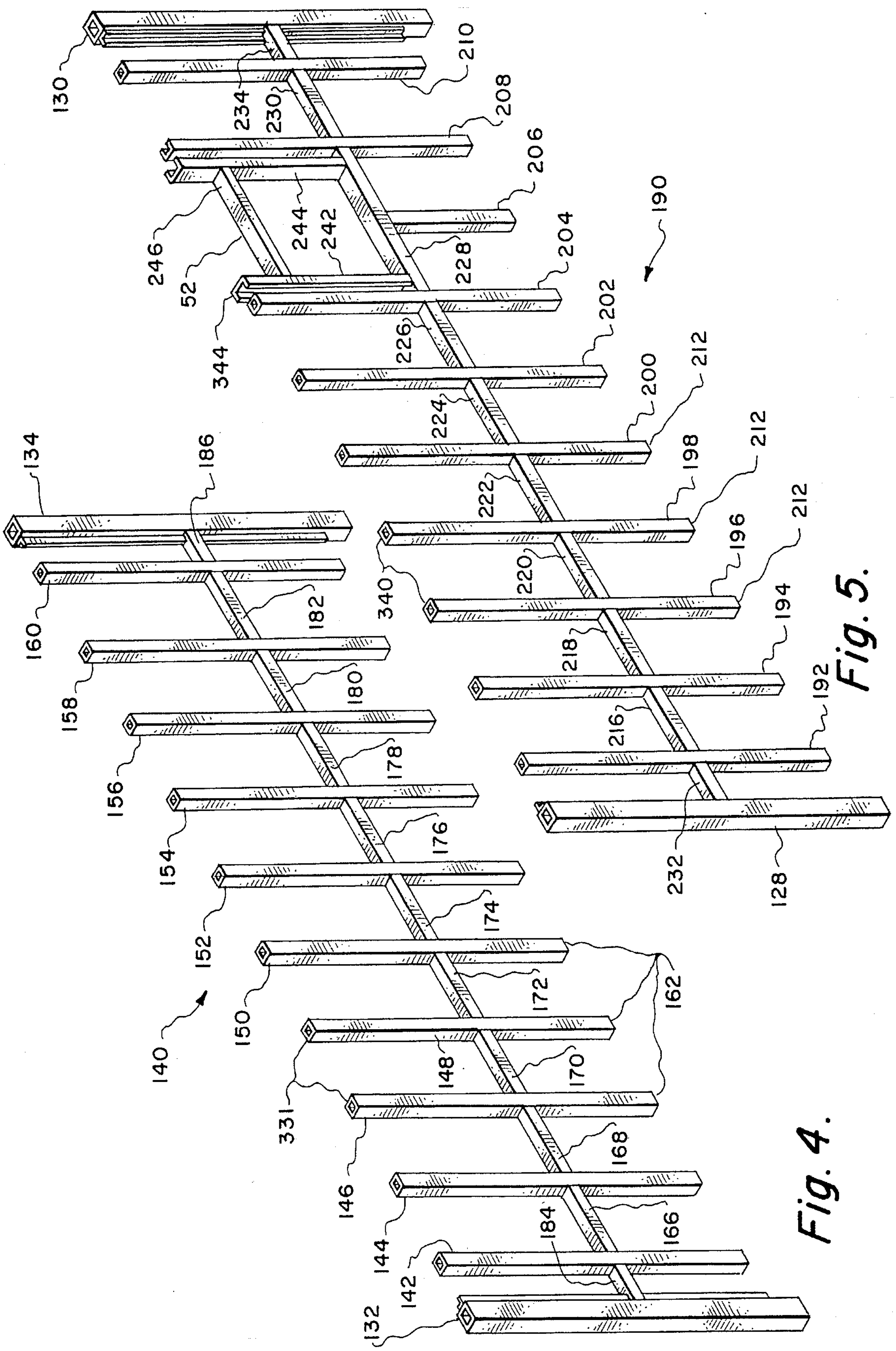
FIG. 4 is an isometric view of the wall support structure for the right side wall of the mobile safety structure of FIG. 2.
FIG. 5 is an isometric view of the wall support structure for the left side wall including a window frame of the mobile safety structure of FIG. 2.

Referring to FIGS. 4, 6 and 9 each tubular wall support member 142–160 of support structure 140 has its upper ends 331 attached to the bottom 332 of right side tubular support member 284 by means of a weld (not shown). In a like manner, each channel member 252 and 254 of support structure 250 has its upper end 334 attached to the bottom 336 of front end tubular support member 288 by means of a weld (not shown).

Referring to FIGS. 5, 7 and 10 each tubular wall support member 192–204, 208 and 210 of support structure 190 has its upper end 340 attached to the bottom 342 of left side tubular support member 286 by means of a weld (not shown). Channel members 242 and 244 of window frame structure 52 also have their upper ends 344 attached to the bottom 342 of left side tubular support member 286 by means of a weld (not shown). In a like manner, each tubular wall support member 264, 266 and 268 of support structure 262 has its upper 346 attached to the bottom 348 of rear end tubular support member 290 by means of a weld (not shown).

At this time it should be noted that each tubular wall support member, tubular cross brace and channel member of support structures 140, 190, 250 and 260 is fabricated tubular steel which is fire proof and non-corrosive.

Referring to FIGS. 1, 2, 5, 7 and 13, there is shown a corner view of the structure of rear wall 42 and left side wall 38 including tubular corner support member 128. The outer wall 349 of left side wall 38 comprises a plurality of rectangular shaped steel wall panels 350 which are attached to the wall supports 192–210 and cross braces 216–232 of support structure 190 by means of plugs welds 352. Similarly, the outer wall 354 of rear wall 42 comprises at least one rectangular shaped wall panel 356 which is attached to the wall supports 264, 266 and 268 and cross braces 272–278 of support structure 162 by means of plug welds 352. Each wall panel 350 and 356 is fabricated from 10 gauge steel plate.

Referring to FIG. 1, it should be noted that front wall 40 has at least one rectangular shaped panel 358 of 10 gauge steel plate which comprises its outer wall 359 and right side wall 36 has a plurality of rectangular shaped steel wall panels 360 which comprises its outer wall 361. Adjacent rectangular shaped steel wall panels of each outer wall 349, 354, 359 and 361 are joined by continuous welds 362.

Figure 13:
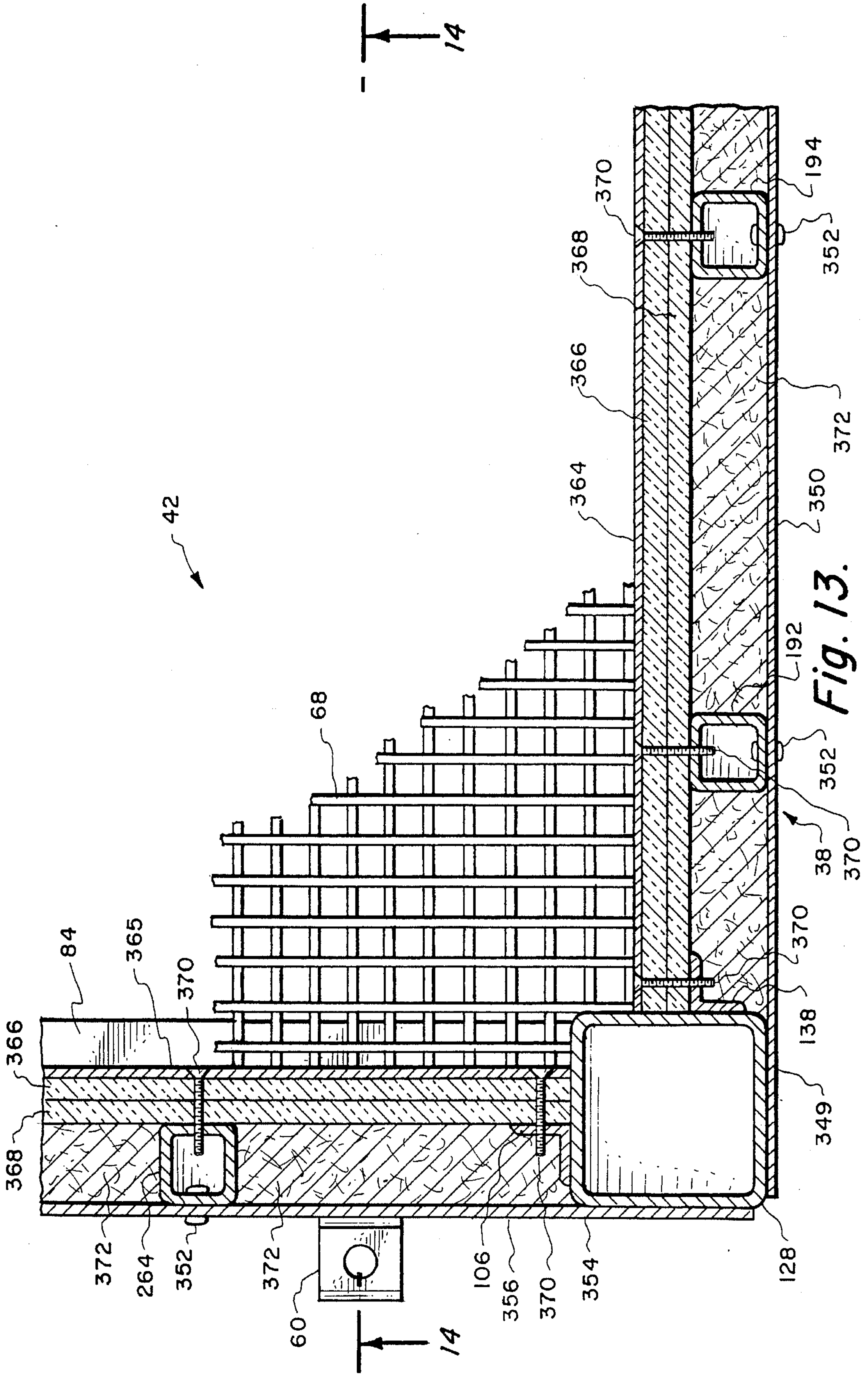
FIG. 13 is a sectional view of a corner of the mobile safety structure of FIG. 1 taken along the plane 13—13 of FIG. 2.

Referring to FIGS. 1, 5, 7, 13 and 18 left side wall 38 and rear wall 42 respectively inner wall panels 364 and 365 of 18 gauge steel plate and at least two stacked sheets 366 and 368 of ¾ inch of ULTRACODE Core gypsum board fabricated by U.S. Gypsum Company of Chicago, Ill. Utilizing the double layer construction of gypsum board illustrated in FIG. 13 provides for a four hour fire rating. The gypsum boards 366 and 368 are stacked with the interior board being designated as 364 and the exterior board being designated as 366.

Figure 18:
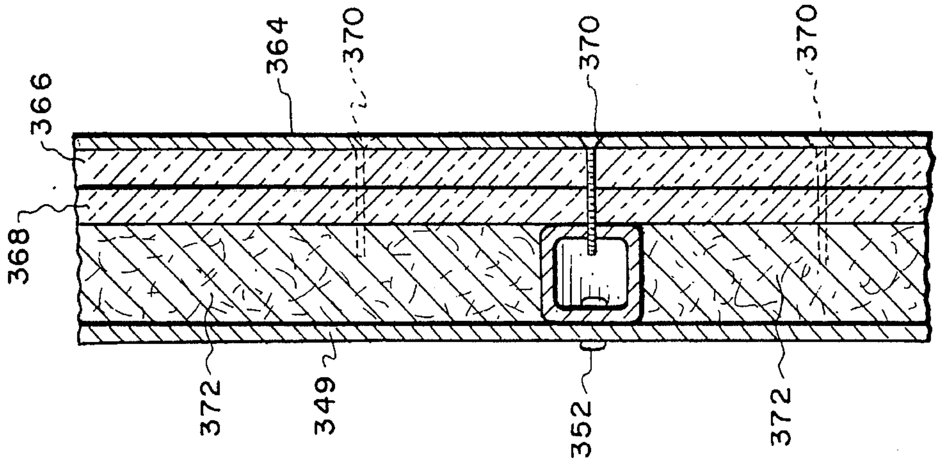
FIG. 18 is another sectional view of the left side wall of the mobile safety structure of FIG. 2 taken along the plane 18—18 of FIG. 2.

As shown in FIGS. 13 and 18, the stacked gypsum boards 364 and 366 and steel plate 364 of left side wall 38 are supported against and secured to the tubular wall support members 192 and 194 and corner brace 138 of corner support member 128 by stainless steel self-tapping screws 370. Similarly, as shown in FIG. 13, the stacked gypsum boards 366 and 368 and steel plate 365 of rear wall 42 are supported against and secured to the tubular wall support member 264 and corner brace 106 of corner support member 128 by stainless steel self-tapping screws 370.

Left side wall 38 of mobile safety structure 30 also has a layer of fiberglass insulation 372 (rated R-19) sandwiched between gypsum board 368 and its outer wall 349. Similarly, rear wall 42 has a layer of fiberglass installation 372 (rated R-19) sandwiched between gypsum board 368 and its outer wall 354.

Figure 14:
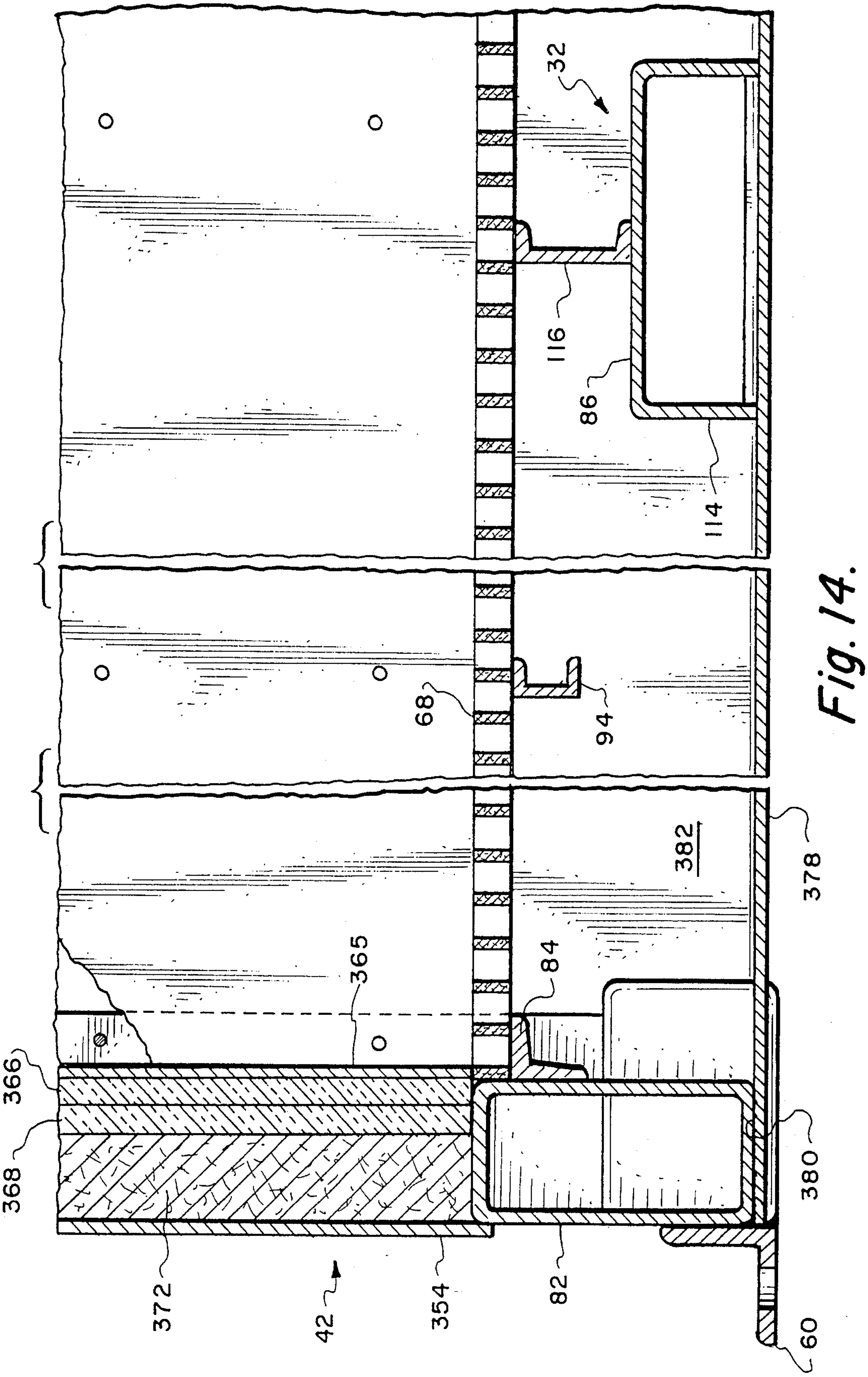
FIG. 14 is a sectional view of the base assembly and floor of the mobile safety structure of FIG. 1 taken along the plane 14—14 of FIG. 13.

Referring to FIGS. 2, 3 and 14, mobile safety structure 30 includes floor 68 which is supported atop base assembly 32 and extends throughout the interior of structure 30. Attached to the bottom of base assembly 32 is a generally rectangular shaped steel plate 378 fabricated of 10 gauge steel plate which is non-corrosive and fire resistant. Plate 378 extends the length and the width of mobile safety structure 30.

As shown in FIG. 14, plate 378 is secured to the bottom surface 380 of rear end tubular support member 82 and the base channel member 114 of inverted T channel support member 86 by means of a continuous welds (not shown). Plate 378 is also secured to right side tubular support member 76, left side tubular support member 78, front end tubular support member 80 and inverted T channel support member 88 by continuous welds in the same manner as illustrated in FIG. 14.

Referring to FIGS. 3 and 14, the preferred embodiment contemplates a removable grating type structure for floor 68 which rest upon floor support members 84, C channel support members 92, 94, 96 and 98 and the floor support channel member 116 of inverted T channel support members 86 and 88. The removable grating structure 68 may be sectional to allow a particular portion of the grating structure 68 to be removed while maintaining the rest of the grating structure 68 as the floor 68 of mobile safety structure 30. The removable grating structure 68 may also cover about two thirds of the floor 68, while the remainder of the floor may be a solid fiberglass structure.

Containers of hazardous materials (not shown) including, for example, 10 gallon drums are stored in mobile safety structure 32. These containers may not be properly sealed which will cause spillage or leakage from the containers. To facilitate, such spillage or leakage from these containers of hazardous materials within mobile safety structure 32, a containment pan 382 below the removable grating which constitutes floor 68. The containment pan 382 is provided with a bottom which is plate 378, sides which are members 76, 78, 80 and 82 and a top which is floor 68. The containment pan 382 is also partition into three sections by members 86 and 88.

By utilizing a removable floor 68 within structure 30, the user of structure may determine whether a spillage or leakage has occurred from containers stored within structure 30 by visually inspecting containment pan 382. The removable floor 68 within structure 30 also facilitates the removal of hazardous materials from containment pan 382 should the hazardous materials be of such nature so as to warrant their removal from structure 30.

Figure 16:
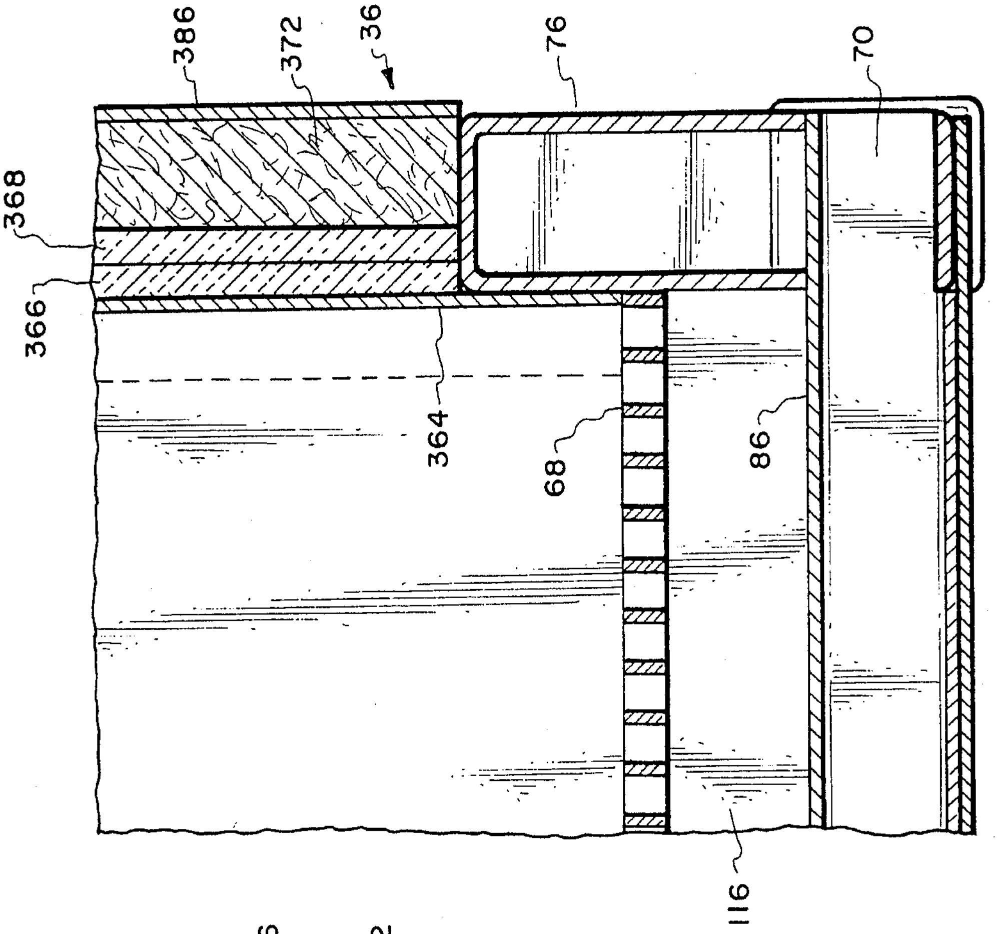
FIG. 16 is a another sectional view of the base assembly, floor and right side wall of the mobile safety structure of FIG. 1 taken along the plane 16—16 of FIG. 1.
Figure 15:
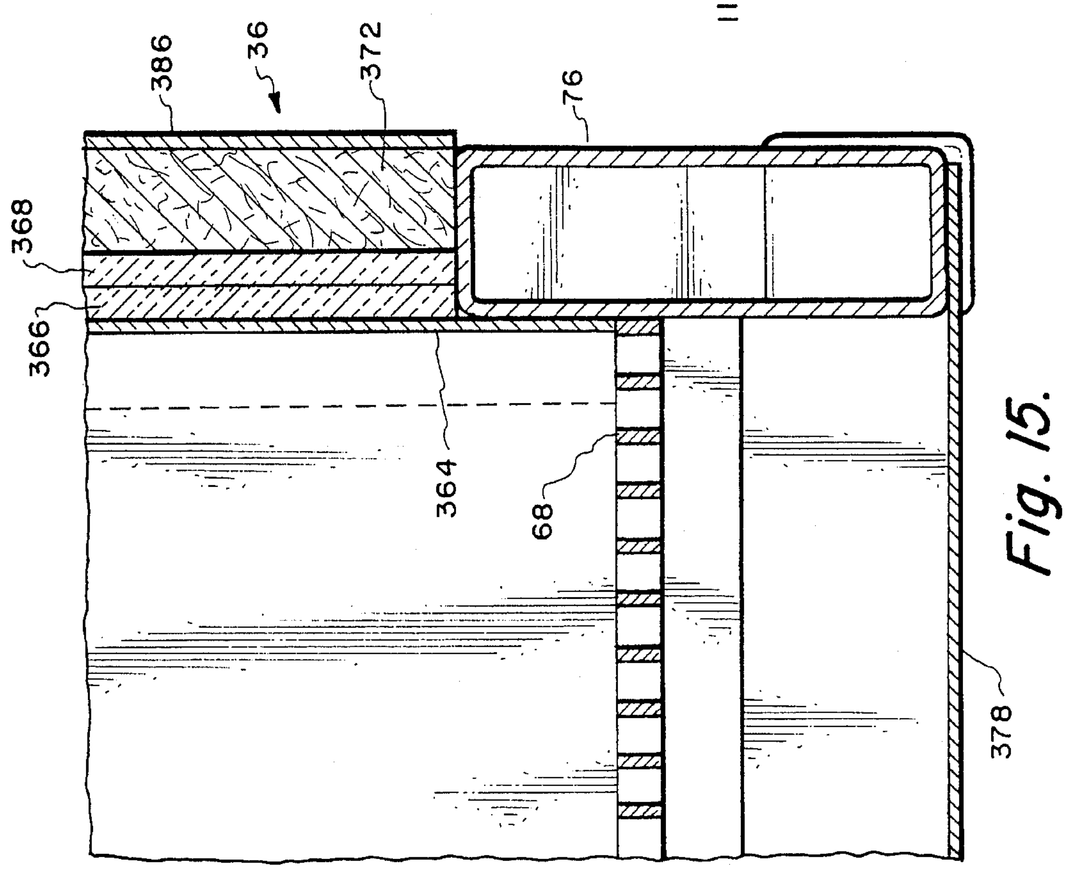
FIG. 15 is a sectional view of the base assembly, floor and right side wall of the mobile safety structure of FIG. 1 taken along the plane 15—15 of FIG. 1.

Referring now to FIGS. 1, 13, 15 and 16, right side wall 36 is fabricated in exactly the same manner as left side wall 38 and rear wall 42. Specifically, right side wall 36 includes an outer wall 386 comprising a plurality of rectangular shaped steel wall panels 388 which are attached to the wall supports 142–160 and cross braces 166–186 of support structure 140 (FIG. 4) by means of plugs welds 352. Right side wall 36 also has an inner wall panel 390 of 18 gauge steel plate and at least two stacked sheets 366 and 368 of ¾ inch of ULTRACODE Core gypsum board. Utilizing the double layer construction of gypsum board illustrated in FIGS. 15 and 16 provides for a four hour fire rating. Right side wall 36 of mobile safety structure 30 also has a layer of fiberglass installation 372 (rated R-19) sandwiched between gypsum board 368 and its outer wall 386.

Figure 17:
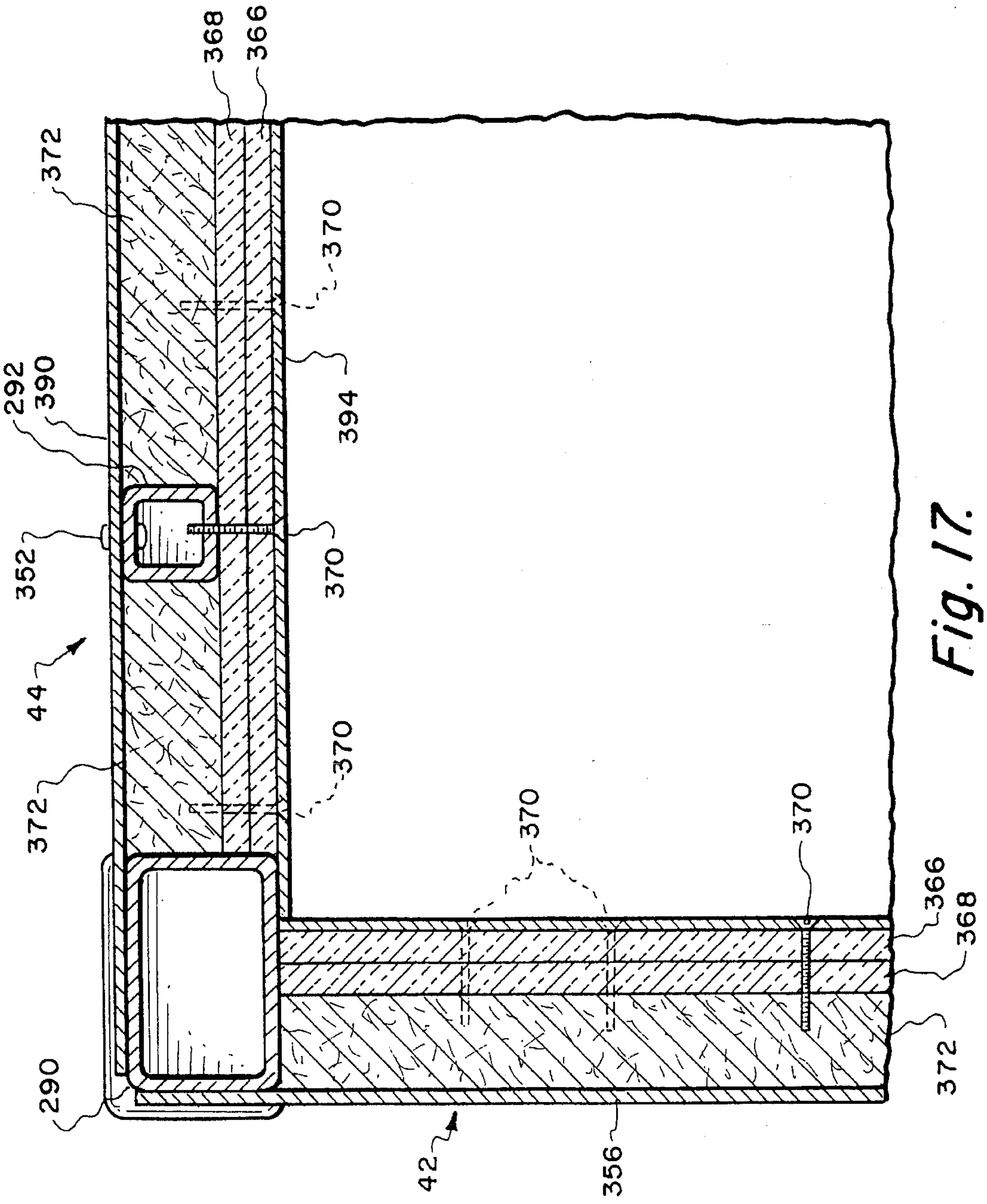
FIG. 17 is a sectional view of the rear wall and roof assembly of the mobile safety structure of FIG. 2 taken along the plane 17—17 of FIG. 2.

Referring to FIGS. 2, 8 and 17, roof assembly 44 is fabricated in exactly the same manner as right side wall 36, left side wall 38 and rear wall 42. Specifically, roof assembly 44 includes an outer wall 390 comprising a plurality of rectangular shaped steel wall panels 392 which are attached to the wall supports 292–310 and cross braces 312–332 of support structure 280 (FIG. 8) by means of plugs welds 352. Roof assembly 44 also has an inner wall panel 394 of 18 gauge steel plate and at least two stacked sheets 366 and 368 of ¾ inch of ULTRACODE Core gypsum board. Utilizing the double layer construction of gypsum board illustrated in FIG. 17 provides for a four hour fire rating. Roof assembly 44 of mobile safety structure 30 also has a layer of fiberglass installation 372 (rated R-19) sandwiched between gypsum board 368 and its outer wall 390. As shown in FIG. 17, the stacked gypsum boards 364 and 366 and steel plate 364 of roof assembly 44 are supported against and secured to the tubular wall roof member 292 by stainless steel self-tapping screws 370.

Figures 19, 20:
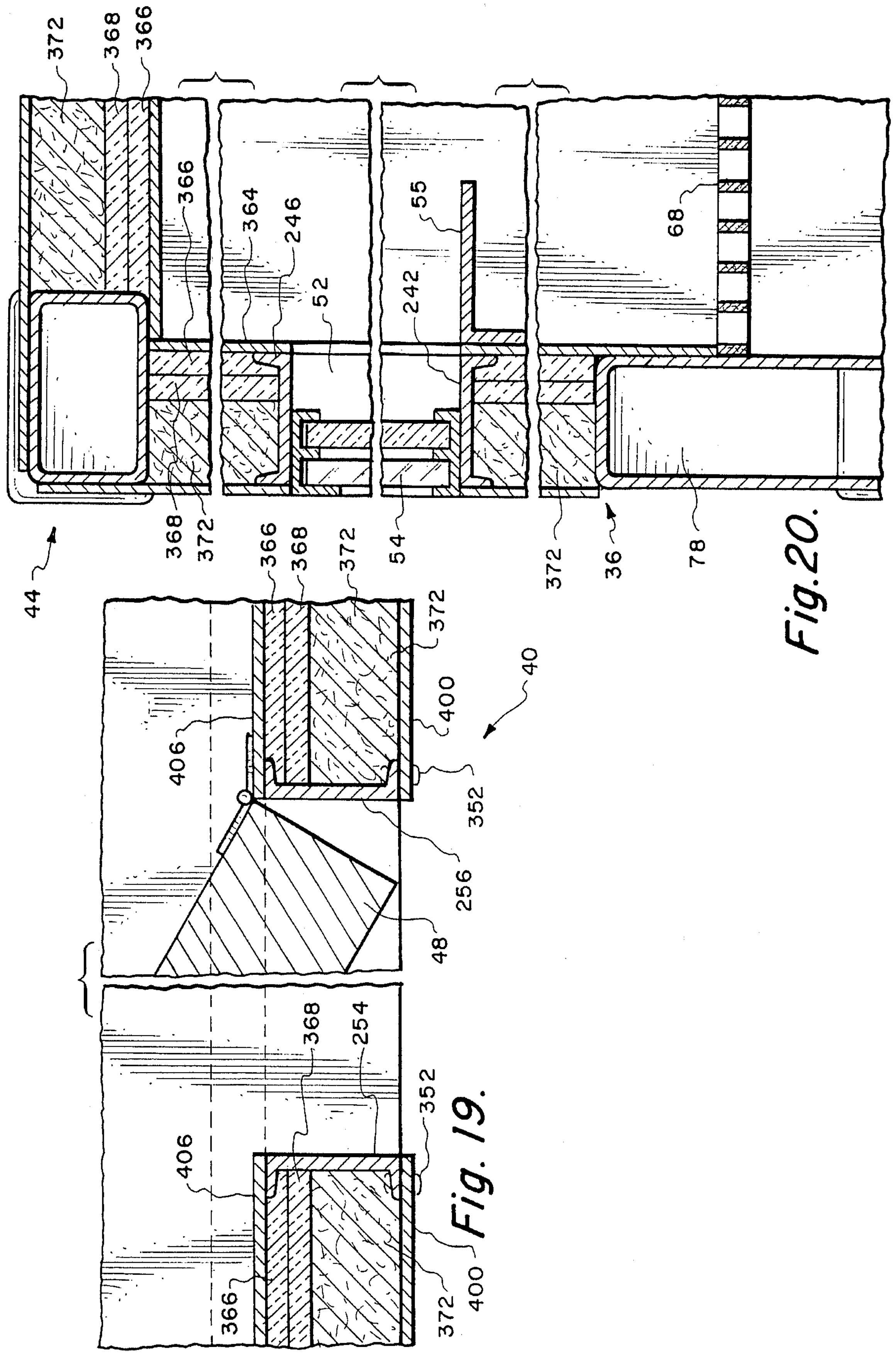
FIG. 19 is a sectional view of the front wall of the mobile safety structure of FIG. 1 taken along the plane 19— 19 of FIG. 2.
FIG. 20 is a sectional view of the left side wall, base assembly and roof assembly of the mobile safety structure of FIG. 2 taken along plane 20—20 of FIG. 2.

Referring now to FIGS. 1, 6 and 19, front wall 40 is fabricated in exactly the same manner as right side wall 36, left side wall 38 and rear wall 42. Specifically, front wall 40 includes an outer wall 400 comprising at least one rectangular shaped wall panel 402 which is attached to the channels members 252 and 254 and cross braces 258 and 260 of support structure 250 (FIG. 6) by means of plugs welds 352. Front wall 40 also has an inner wall panel 406 of 18 gauge steel plate and at least two stacked sheets 366 and 368 of ¾ inch of ULTRACODE Core gypsum board. Utilizing the double layer construction of gypsum board illustrated in FIGS. 17 provides for a four hour fire rating. Front wall 40 of mobile safety structure 30 also has a layer of fiberglass installation 372 (rated R-19) sandwiched between gypsum board 368 and its outer wall 400.

Referring to FIGS. 1, 2 and 20, by utilizing fiberglass insulation 372 (rated R-19) within the walls 36, 38, 40 and 42 and roof assembly 44, mobile safety structure 30 is adapted for use in varying climatic conditions. For example, if it is desired to use mobile safety structure 30 in a hot arid climate to distribute hazardous materials, air conditioning could be incorporated in mobile safety structure 30 to protect the user of structure 30 from heat exposure since the fiberglass installation will retain cool air within structure 30.

The present invention uses seismic secondary shelving units (not illustrated) for the storage of hazardous materials. The seismic secondary shelving units used in the interior portion 50 of mobile safety structure 30 for storage of hazardous materials is a shelving unit manufactured by Shields Mfg. Co. Inc. of Oxnard, Calif. and described in U.S. Pat. No. 5,356,206 which issued Oct. 18, 1994 to Gary Van Valkenburgh, a co-inventor of the mobile safety structure 30 of the present invention. The seismic secondary units are used to relieve spills of hazardous materials on the shelves, are adjustable for various container sizes and allow for movement of containers of hazardous materials stored within the interior portion 50 of mobile safety structure 30.

It should also be understood that the present invention contemplates means such as side wall or roof vents (not shown) or an air conditioning and heating system (not shown) to provide the user of mobile safety structure 30 with adequate ventilation and/or climate control.

From the foregoing, it may readily be seen that the present invention comprises a new, unique and exceedingly useful mobile safety structure for the containment and handling of hazardous materials which constitutes a considerable improvement over the known prior art. Obviously, many modifications and variations of the present invention are possible in light of the above teachings. It is therefore to be understood that within the scope of the appended claims the invention may be practiced otherwise than as specifically described.

What is claimed is:

1. A mobile safety structure for housing containers of hazardous materials and providing sump-type secondary containment for receiving spillage and leakage of said hazardous materials from said containers that are housed within said mobile safety structure, said mobile safety structure comprising:

(a) a rectangular shaped base assembly including a framework of a welded assembly of steel components, said framework of said base assembly comprising:

(i) a pair of front and rear support members and a pair of side support members that are arranged end to end to define a rectangular shaped structure, four corner fittings having first and second orthogonally disposed sides, a top portion and a bottom portion, each end of each of said side support members being attached to the first side of a separate one of said four corner fittings and each end of each of said front and rear support members being attached to the second side of a separate one of said corner fittings;

(ii) a pair of inverted T channel support members disposed substantially parallel to said front and rear support members, one end of each of said inverted T channel support members being attached to one of said side support members and an opposite end of each of said inverted T channel support members being attached the other of said side support members, each of said inverted T channel support members having a base channel member and a floor support channel member mounted on a top portion of said base channel member;

(iii) first and second floor support members respectively attached to an inner side of said front support member and an inner side of said rear support member;

(iv) a first generally rectangular shaped steel plate mounted on a bottom portion of said front, rear and side support members and a bottom portion of the base channel support member of said pair inverted T channel support member wherein said first generally rectangular shaped steel plate mates with said front, rear and side support members forming a substantially rectangular open secondary container that is leakproof, said open secondary container receiving spillage and leakage of said hazardous materials from said containers that are housed within said mobile safety structure;

(v) a removable grating type floor supported by base assembly and resting upon said first and second floor support members and the floor support channel members of said pair of inverted T channel support members, said removable grating type floor extending substantially horizontally atop said open secondary container;

(b) first and second side walls extending perpendicularly upward from said base assembly, a rear wall extending perpendicularly upward from said base assembly and a front wall extending perpendicularly upward from said base assembly, one end of each of said side walls being secured to a separate one of the opposed ends of said front wall and the other end of each of said side walls being secured to a separate one of the opposed ends of said rear wall to form a rectangular shaped assembly of upstanding walls;

(c) a rectangular shaped roof mounted atop said rectangular shaped assembly of upstanding walls and extending horizontally over an interior space that is defined between said front and rear walls and between said first and second side walls;

(d) each of said front, rear and side walls and said roof comprising:

(i) a rectangular shaped framework of structural steel support members, at least one outer wall panel mounted to an outer surface of said rectangular shaped framework, an inner wall panel mounted to an inner surface of said rectangular shaped framework, a pair of stack sheets of gypsum type board sandwiched between said at least one outer wall panel and said inner wall panel, said pair of stack sheets of gypsum board being secured to said inner wall panel, and a fiberglass insulation material interposed between said pair of stack sheets of gypsum type board and said at least one outer wall panel;

(ii) said pair of stack sheets of gypsum type board within each of said front, rear and side walls and said roof providing for a fire rating of at least four hours for said mobile safety structure and said fiberglass insulation material allowing said mobile safety structure to be adapted for use under varying climatic conditions.

2. The mobile safety structure of claim 1 further comprising a rectangular shaped door frame mounted within said front wall of said mobile safety structure, a door connected to said door frame and being movable relatively thereto for controlling access to an interior space within said mobile safety structure through a door opening that is defined at least in part by said door frame.

3. The mobile safety structure of claim 1 further comprising a rectangular shaped window frame mounted within one of said side walls, said window frame having a sliding glass window mounted therein.

4. The mobile safety structure of claim 1 further comprising four dual wheel casters, each of said four dual wheel casters being coupled to a separate one of said four corner fittings of said base assembly, said four dual wheel corner casters allowing a movement of said mobile safety structure from a first location to a second location.

5. The mobile safety structure of claim 1 further comprising a tow bar coupled to two of said four corner fittings.

6. The mobile safety structure of claim 1 wherein said fiberglass insulation material comprises R-19 rated fiberglass insulation.

7. The mobile safety structure of claim 1 wherein said at least one panel of each of said front, rear and side walls and said roof is fabricated from 10 gauge steel plate.

8. The mobile safety structure of claim 1 wherein said inner wall panel of each of said front, rear and side walls and said roof is fabricated from 18 gauge steel plate.

9. The mobile safety structure of claim 1 further comprising means for securing said pair of stack sheets of gypsum type board and said inner wall panel to the rectangular shaped framework of structural steel support members for each of said front, rear and side walls and said roof.

10. The mobile safety structure of claim 9 wherein said means for securing said gypsum type board and said inner wall panel comprises stainless steel self-tapping screws.

11. The mobile safety structure of claim 1 wherein each of said pair of stack sheets of gypsum board comprises a ¾ inch of gypsum board.

12. A mobile safety structure for housing containers of hazardous materials and providing sump-type secondary containment for receiving spillage and leakage of said hazardous materials from said containers that are housed within said mobile safety structure, said mobile safety structure comprising:

(a) a rectangular shaped base assembly including a framework of a welded assembly of steel components, said framework of said base assembly comprising:

(i) a pair of front and rear support members and a pair of side support members that are arranged end to end to define a rectangular shaped structure, four corner fittings having first and second orthogonally disposed sides, a top portion and a bottom portion, each end of each of said side support members being attached to the first side of a separate one of said four corner fittings and each end of each of said front and rear support members being attached to the second side of a separate one of said corner fittings;

(ii) a pair of inverted T channel support members disposed substantially parallel to said front and rear support members, one end of each of said inverted T channel support members being attached to one of said side support members and an opposite end of each of said inverted T channel support members being attached the other of said side support members, each of said inverted T channel support members having a base channel member and a floor support channel member mounted on a top portion of said base channel member;

(iii) first and second floor support members respectively attached to an inner side of said front support member and an inner side of said rear support member;

(iv) a first generally rectangular shaped steel plate mounted on a bottom portion of said front, rear and side support members and a bottom portion of the base channel support member of said pair inverted T channel support member wherein said first generally rectangular shaped steel plate mates with said front, rear and side support members forming a substantially rectangular open secondary container that is leakproof, said open secondary container receiving spillage and leakage of said hazardous materials from said containers that are housed within said mobile safety structure;

(v) a removable grating type floor supported by base assembly and resting upon said first and second floor support members and the floor support channel members of said pair of inverted T channel support members, said removable grating type floor extending substantially horizontally atop said open secondary container;

(b) first and second side walls extending perpendicularly upward from said base assembly, a rear wall extending perpendicularly upward from said base assembly and a front wall extending perpendicularly upward from said base assembly, one end of each of said side walls being secured to a separate one of the opposed ends of said front wall and the other end of each of said side walls being secured to a separate one of the opposed ends of said rear wall to form a rectangular shaped assembly of upstanding walls;

(c) a rectangular shaped roof mounted atop said rectangular shaped assembly of upstanding walls and extending horizontally over an interior space that is defined between said front and rear walls and between said first and second side walls;

(d) each of said front, rear and side walls and said roof comprising:

(i) a rectangular shaped framework of structural steel support members, at least one outer wall panel mounted to an outer surface of said rectangular shaped framework, an inner wall panel mounted to an inner surface of said rectangular shaped framework, a pair of stack sheets of gypsum type board sandwiched between said at least one outer wall panel and said inner wall panel, said pair of stack sheets of gypsum board being secured to said inner wall panel, and a fiberglass insulation material interposed between said pair of stack sheets of gypsum type board and said at least one outer wall panel;

(ii) said pair of stack sheets of gypsum type board within each of said front, rear and side walls and said roof providing for a fire rating of at least four hours for said mobile safety structure and said fiberglass insulation material allowing said mobile safety structure to be adapted for use under varying climatic conditions;

(e) a rectangular shaped door frame mounted within said front wall of said mobile safety structure, a door connected to said door frame and being movable relatively thereto for controlling access to an interior space within said mobile safety structure through a door opening that is defined at least in part by said door frame;

(f) a rectangular shaped window frame mounted within one of said side walls, said window frame having a sliding glass window mounted therein; and (g) four dual wheel casters, each of said four dual wheel casters being coupled to a separate one of said four corner fittings of said base assembly, and a tow bar coupled to two of said four corner fittings, said tow bar being adapted for connection to a tow truck allowing said mobile safety structure to be moved from a first location to a second location.

13. The mobile safety structure of claim 12 wherein said fiberglass insulation material comprises R-19 rated fiberglass insulation.

14. The mobile safety structure of claim 13 wherein said at least one panel of each of said front, rear and side walls and said roof is fabricated from 10 gauge steel plate.

15. The mobile safety structure of claim 14 wherein said inner wall panel of each of said front, rear and side walls and said roof is fabricated from 18 gauge steel plate.

16. The mobile safety structure of claim 15 further comprising means for securing said pair of stack sheets of gypsum type board and said inner wall panel to the rectangular shaped framework of structural steel support members for each of said front, rear and side walls and said roof.

17. The mobile safety structure of claim 16 wherein said means for securing said gypsum type board and said inner wall panel comprises stainless steel self-tapping screws.

18. The mobile safety structure of claim 16 wherein each of said pair of stack sheets of gypsum board comprises a ¾ inch of gypsum board.

* * * * *